United States Patent [19]

Pärsson et al.

[11] 4,092,387

[45] May 30, 1978

[54] PROCESS FOR THE PRODUCTION OF ARTICLES OF CELLULAR PLASTIC PROVIDED WITH A COVERING OF ANOTHER MATERIAL

[75] Inventors: Nils Owe Pärsson, Trollhattan; Hans Harald Dymling, Gothenburg, both of Sweden

[73] Assignee: Saab-Scania AB, Sodertalje, Sweden

[21] Appl. No.: 652,056

[22] Filed: Jan. 26, 1976

Related U.S. Application Data

[63] Continuation of Ser. No. 479,179, Jun. 13, 1974, abandoned.

[30] Foreign Application Priority Data

Jun. 18, 1973 Sweden .................................. 7308505

[51] Int. Cl.$^2$ .............................................. B29D 27/00
[52] U.S. Cl. .................................. 264/46.6; 264/46.4; 264/46.7; 264/135
[58] Field of Search ................... 264/46.4, 46.6, 46.9, 264/135, 264, 265, 130, 46.7

[56] References Cited

U.S. PATENT DOCUMENTS

| | | | |
|---|---|---|---|
| 3,468,991 | 9/1969 | Krug | 264/45.5 |
| 3,499,065 | 3/1970 | Hoskinson et al. | 264/54 |
| 3,691,265 | 9/1972 | Cobbledick | 264/92 |
| 3,867,492 | 2/1975 | Drostholm | 264/46.6 |
| 3,925,528 | 12/1975 | Muller et al. | 264/46.4 |

*Primary Examiner*—James B. Lowe
*Attorney, Agent, or Firm*—Cushman, Darby & Cushman

[57] ABSTRACT

A method for producing articles of a cellular plastics material provided with a surface covering comprising a film or foil of a thermoplastic material or a metal or a textile where the side of the covering facing the cellular plastics material is treated with or comprises a chemical substance acting as a retarder for the chemical reaction providing the bonding between the covering and the cellular plastics material. The cellular plastic material is able to expand freely in a mold and to bond to the covering without forming a deformed cellular structure in the cellular plastic material in the boundary layer adjacent to the covering.

6 Claims, No Drawings

PROCESS FOR THE PRODUCTION OF ARTICLES OF CELLULAR PLASTIC PROVIDED WITH A COVERING OF ANOTHER MATERIAL

This is a continuation, of application Ser. No. 479,179 filed June 13, 1974 and now abandoned.

The present invention relates to a method for producing articles of a substantially polymer cellular plastics material, said article being essentially provided with a supplementary surface covering, said cellular plastics material comprising polyurethane or epoxy or similar cellular plastics material which by foaming, polymerization and gelling in a mold is shaped to an article, said covering comprising a film or foil of a thermoplastic material or a metal or a textile with a thermoplastic or cellular plastic attached to one side, by which method the covering is applied in the mold, and the starting material for the cellular plastic is introduced and caused to foam during filling of the mold, the pressure resulting from the foaming shaping the covering to conform to the inner limiting surface of the mold with or without the assistance of mechanical processing.

The production of cellular plastic articles with outer coverings by the above-disclosed method is previously known, but the quality of these articles has, in many respects, been unsatisfactory. The reason for this is that the cellular plastic attaches itself to the film during foaming and is thereby prevented from expanding freely. This causes the foam to take on an anisotropic cell structure at the boundary layer to the film. Air inclusions and gas bubbles in the boundary layer between the cellular plastic and the film are also formed, which is particularly noticeable for articles which comprise thin portions. This premature attachment or "adhesion" to the film has meant that the end products in such weakened boundary layers have obtained inferior strength characteristics, reduced heat stability and poorer resistance to water and chemicals. In order to obtain a good bubble-free attachment between the foam and the film, especially for surfaces with sharp bends in different directions, the foil has been pre-stressed when being placed in the mold. The results, however, have not been totally successful since further stresses occur in the film during molding, especially in those parts which are subjected to sharp bending. If the film is damaged at such points, a very small damage can give an indication of fracture which causes the film to split along a considerably longer distance.

The aim of the present invention is to obviate the above-mentioned disadvantages and provide a method of the type cited in the introduction which is simple and inexpensive and which gives a fully satisfactory product. This is accomplished according to the invention if the side of the covering facing the cellular plastic, is treated with or comprises at least one chemical substance which causes a retardation or acceleration of the chemical reaction of the cellular plastic for its bonding to the covering by generating a temporarily adhesion-poor layer, whereby the main part of the cellular plastics material is able to expand freely in the mold without forming a deformed cellular structure in the cellular plastics material in the boundary layer adjacent to the covering.

The fundamental idea behind the present invention is that the cellular plastic during foaming in a mold intended for this, advantageously of aluminum, will be able to expand in the mold with the least possible resistance from the film. In a door panel for automobiles with a core of hard polyurethane and a covering of elastic polyvinyl chloride film, according to the exemplification below, the film is applied in the mold without prestressing, which compared with previously known methods for prestressing the film requires less force for molding the film in the desired way. The cellular plastic can thereby expand more unimpededly.

The use of a non-prestressed film increases, however, the risks for arisal of wrinkles and folds in the end product outer layer, but this increased risk is reduced by heating the film, or at least those portions which are subjected to sharp bending, to a temperature which makes the film either wholly or in part plastically moldable. This further reduces the force which is required to mold the film and gives a further increased freedom to the cellular plastic during foaming. The heating can take place by any appropriate means, taking into consideration the conditions in each separate case; for example with infrared heat or with the aid of electric heating elements which are brought into contact with the film, or by directing warm air against the film. The best effect is achieved, however, when the side of the film facing away from the foam is heated.

The reaction of the foam is exothermic. The film acts as an insulating layer while the mold can facilitate the dispersion of reaction heat where it comes in direct contact with the foam material. The character of the foam thus can vary in different zones of an article. The differences are, however, small when the foam has the possibility of more easily moving over the film surface during expansion.

To facilitate the expansion of the cellular plastic, the film is treated, according to the invention, on the side facing the cellular plastic in such a way that the adhesion between the cellular plastic and the treated film during the principal portion of foaming differs from the adhesion between the cellular plastic and the film without treatment. The purpose of such treatment is the avoidance of air inclusions and gas bubbles in the boundary layer beteeen the film and the cellular plastic. It has namely been shown that the cellular plastic adheres to an untreated film even before the foaming is complete. This leads to the ready formation of air inclusions, especially at thin portions. Adhesion also causes the cellular plastic cells in the boundary layer between the film and the cellular plastic to be deformed and to take on an anisotropic structure when the foaming continues. This implies that the cells are extended in the direction of foam rising with the result that their strength is reduced in a direction perpendicular to the direction of rising. The risk that the cells will burst and that gas bubbles will be formed is therefore very great.

The above-mentioned treatment of the film can be carried out in several different ways. One method is to coat the side of the film facing the cellular plastic with, by way of example, an isocyanate or polyol or other therewith comparable compound, which causes the degree of adhesion between the cellular plastics material and the film during expansion of the plastic to be less than would be the case if the film were untreated. In other words, the treatment will produce an adhesion-poor layer which gives the foam the possibility of expanding completely before it reacts with the layer and is bound to the film. In the exemplified process one side of the film is treated with an agent comprising an elastic polyurethane varnish with an excess of polyol. Said treatment agent has low friction in relation to the liquid cellular plastic and effects thereby a slip layer which retards the chemical reaction of the cellular plastic for adhesion to the film until rising in the mold is complete. The retardation implies that the cells in the cellular plastic achieve a substantially isotropic structure.

Another method for treating the film is to treat the side of the film facing the cellular plastic with a retarder, i.e., a product which effects a retardation of the polymerization of the foam material, so that adhesion is temporarily delayed. The increase in viscosity produced through polymerization should hereby proceed more slowly in the material which is found in the layer nearest the film surface. In this way the foam material itself acts as a temporarily adhesion-poor layer, which allows the remaining foam material to freely expand without adhesion to the film surface. The reaction thus takes place more slowly in the boundary layer than in the rest of the foam, but will, in spite of this, react completely and produce a satisfactory adhesion between the cellular plastic and the film. The cells in the boundary layer will, in this way, have an opportunity to be more evenly shaped. This type of retarder can be applied to the film even during production of the film, but it can also be applied in connection with the production of the cellular plastic article. Appropriate retarders in the exemplified process can comprise an acyl chloride, e.g., benzoyl chloride, adipoyl chloride or a similar reaction inhibiting compound.

The invention is, in other words, not limited to any special embodiment, nor is it limited to the above-described examples. Alterations and modifications can be carried out within the scope of the claims which follow. Thus the film itself can comprise chemical substances which influence the chemical reaction of the cellular plastic for adhesion to the film according to one of the above methods.

Within the scope of the invention the surface covering can also comprise a textile which on the side facing the cellular plastic mass is furnished with a sealing thermoplastic or cellular plastic having properties equivalent to the treatment agent in the methods.

In the exemplified process the cellular plastic mass has comprised polyurethane and the surface covering has been made from a polyvinyl chloride film. Within the scope of the invention the cellular plastic material can comprise some other polymer cellular plastic material, by way of example epoxy, in which case the treatment agent and/or the film must be modified in relation thereto in order to comply with at least one of the above-mentioned main principles for adhesion, i.e., to produce a slip layer, a retarder effect or an accelerator effect between the cellular plastic material and the surface covering during the cellular plastic expansion period in the mold.

What we claim is:

1. A method for producing articles of a polymer cellular plastic material which by foaming, polymerization and gelling in a mold is shaped to an article having a core of said polymer cellular plastic material and bonded thereto a supplementary surface covering of a thermoplastic material or a textile with a thermoplastic material bonded to the side facing the cellular plastic material, said method comprising placing the covering in the mold, then introducing the plastic material and causing it to foam forming a cellular plastic material during filling of the mold, the pressure resulting from the foaming shaping the covering under tension in accordance with the inner limiting surface of the mold, the side of the covering facing the cellular plastic material comprising at least one liquid chemical substance, wherein said liquid chemical substance is a polyurethane varnish containing an excess amount of polyol or an acyl chloride which causes a retardation of the chemical reaction bonding the cellular plastic material to the covering by generating a temporary adhesion-poor layer, whereby the cellular plastic material is able to expand freely in the mold and to bond to the covering without forming a deformed cellular structure in the cellular plastic material in the boundary layer adjacent to the covering.

2. A method according to claim 1 wherein the polymer cellular plastic material comprises polyurethane and the covering comprises a thermoplastic film and wherein the covering is treated with a polyurethane varnish containing an excess amount of polyol, which causes a delay in the chemical reaction of the cellular plastic material for its bonding to the covering by generating a slip layer adjacent to the boundary layer of the covering.

3. A method as in claim 2 wherein said thermoplastic film is an elastic polyvinyl chloride film.

4. A method according to claim 1 wherein the polymer cellular plastic material comprises polyurethane and the covering comprises a thermoplastic film and wherein the covering is treated with an acyl chloride which causes a delay in the chemical reaction of the cellular plastic material adjacent to the boundary layer of the covering.

5. A method as in claim 4 wherein said thermoplastic film is an elastic polyvinyl chloride film.

6. A method according to claim 4 wherein said acyl chloride is benzoyl chloride or adipoyl chloride.

* * * * *